(12) United States Patent
Yoon et al.

(10) Patent No.: US 10,112,658 B2
(45) Date of Patent: Oct. 30, 2018

(54) SPOILER APPARATUS FOR RV VEHICLE

(71) Applicant: HYUNDAI MOTOR COMPANY, Seoul (KR)

(72) Inventors: Jin Young Yoon, Gimpo-si (KR); Hyun Gyung Kim, Hwaseong-si (KR); Keon Soo Jin, Ulsan (KR); Ki Hong Lee, Seoul (KR); Dong Eun Cha, Seongnam-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 116 days.

(21) Appl. No.: 15/452,382

(22) Filed: Mar. 7, 2017

(65) Prior Publication Data

US 2018/0134328 A1  May 17, 2018

(30) Foreign Application Priority Data

Nov. 14, 2016 (KR) .................. 10-2016-0151100

(51) Int. Cl.
  *B60J 9/00* (2006.01)
  *B62D 35/00* (2006.01)
  *B62D 37/02* (2006.01)

(52) U.S. Cl.
  CPC .......... *B62D 35/007* (2013.01); *B62D 37/02* (2013.01)

(58) Field of Classification Search
  CPC ...... B60S 1/381; B60S 1/3881; B60S 1/3879; B60S 1/3808; B62D 35/007; H05K 7/1497; H05K 7/20745; H05K 7/20836; H05K 7/20736; G06F 1/20

USPC .................. 296/180.5, 180.1, 180.3, 216.03; 180/903
  See application file for complete search history.

(56) References Cited

U.S. PATENT DOCUMENTS

| | | | | |
|---|---|---|---|---|
| 3,455,594 A | * | 7/1969 | Mrlik | B60G 17/00 188/270 |
| 4,558,898 A | * | 12/1985 | Deaver | B62D 35/007 264/251 |
| 4,674,788 A | * | 6/1987 | Ohmura | B62D 35/007 296/180.5 |
| 4,707,014 A | * | 11/1987 | Rich | B60Q 1/05 296/180.1 |
| 4,756,568 A | * | 7/1988 | Yamamoto | B60S 1/0405 15/250.16 |
| 4,773,692 A | * | 9/1988 | Schleicher | B62D 35/007 296/180.5 |
| 4,776,626 A | * | 10/1988 | Seyler | E05D 5/062 16/289 |
| 4,810,022 A | * | 3/1989 | Takagi | B62D 35/005 180/197 |
| 4,854,635 A | * | 8/1989 | Durm | B62D 35/007 296/180.1 |

(Continued)

FOREIGN PATENT DOCUMENTS

| | | |
|---|---|---|
| JP | H066044 U | 1/1994 |
| JP | 2008-143519 A | 6/2008 |

(Continued)

*Primary Examiner* — Kiran B Patel
(74) *Attorney, Agent, or Firm* — McDonnell Boehnen Hulbert & Berghoff LLP

(57) ABSTRACT

Disclosed herein is a spoiler apparatus for an RV vehicle, capable of improving driving performance and stability by installing a spoiler to an RV vehicle so as to control an air flow according to the traveling speed thereof.

12 Claims, 4 Drawing Sheets

(56) References Cited

U.S. PATENT DOCUMENTS

| | | | | |
|---|---|---|---|---|
| 4,887,681 | A * | 12/1989 | Durm | B60K 11/08 180/68.1 |
| 4,889,382 | A * | 12/1989 | Burst | F01P 11/10 296/180.5 |
| 5,120,105 | A * | 6/1992 | Brin | B62D 35/007 296/180.5 |
| 5,141,281 | A * | 8/1992 | Eger | B62D 35/007 296/180.5 |
| 5,356,195 | A * | 10/1994 | Kanda | B62D 35/007 296/146.8 |
| 5,360,253 | A * | 11/1994 | Sasaki | B62D 35/007 296/152 |
| 5,454,619 | A * | 10/1995 | Haraway, Jr. | B62D 35/007 180/903 |
| 5,918,929 | A * | 7/1999 | Vagis | B62D 35/007 296/180.1 |
| 6,139,090 | A * | 10/2000 | Stidd | B62D 35/007 180/903 |
| 6,170,904 | B1 * | 1/2001 | Schaedlich | B62D 35/007 180/903 |
| 6,189,837 | B1 * | 2/2001 | Matthews | B64C 9/32 244/213 |
| 6,196,620 | B1 * | 3/2001 | Haraway, Jr. | B62D 35/007 180/903 |
| 6,378,932 | B1 * | 4/2002 | Fasel | B62D 35/001 180/903 |
| 6,540,282 | B2 * | 4/2003 | Pettey | B62D 35/007 180/903 |
| 6,631,945 | B2 * | 10/2003 | Schleicher | B60J 7/05 296/221 |
| 6,712,424 | B2 * | 3/2004 | Swain | B60R 9/06 224/519 |
| 7,036,871 | B2 * | 5/2006 | Adams | B62D 35/007 180/903 |
| 7,111,898 | B2 * | 9/2006 | Rinklin | B62D 35/007 296/180.1 |
| 7,213,870 | B1 * | 5/2007 | Williams | B62D 35/007 296/180.3 |
| 7,264,300 | B2 * | 9/2007 | Hillgaertner | B62D 35/007 296/180.5 |
| 7,309,043 | B2 * | 12/2007 | Good | B64C 9/16 244/99.2 |
| 7,665,796 | B2 * | 2/2010 | Wegener | B62D 35/007 180/903 |
| 7,770,962 | B1 * | 8/2010 | Maxwell | B62D 35/007 296/180.5 |
| 7,841,646 | B2 * | 11/2010 | Paul | B62D 37/02 296/180.1 |
| 9,102,367 | B1 * | 8/2015 | Beierl | B62D 37/02 |
| 9,415,816 | B2 * | 8/2016 | Shiga | B62D 35/007 |
| 9,527,535 | B1 * | 12/2016 | Cha | B62D 35/007 |
| 9,567,015 | B2 * | 2/2017 | Wolf | B62D 35/007 |
| 9,764,615 | B2 * | 9/2017 | Mosher | B60G 99/006 |
| 9,868,478 | B2 * | 1/2018 | Kishima | B62D 35/007 |
| 9,902,246 | B1 * | 2/2018 | Driessen | B60J 7/22 |
| 2005/0061922 | A1 * | 3/2005 | Milliere | B64C 9/04 244/213 |
| 2005/0248182 | A1 * | 11/2005 | Dringenberg | B62D 35/007 296/180.5 |
| 2006/0186698 | A1 * | 8/2006 | Roth | B62D 35/007 296/180.1 |
| 2007/0145776 | A1 * | 6/2007 | Grave | B62D 35/007 296/180.5 |
| 2007/0228772 | A1 * | 10/2007 | Froeschle | B62D 35/007 296/180.1 |
| 2007/0228773 | A1 * | 10/2007 | Froeschle | B62D 35/007 296/180.5 |
| 2007/0236045 | A1 * | 10/2007 | Froeschle | B62D 35/007 296/180.5 |
| 2007/0236046 | A1 * | 10/2007 | Froeschle | B62D 35/007 296/180.5 |
| 2008/0061596 | A1 * | 3/2008 | Brown | B60T 1/16 296/180.1 |
| 2008/0179915 | A1 * | 7/2008 | Wegener | B62D 35/007 296/180.1 |
| 2008/0211261 | A1 * | 9/2008 | Wegener | B60T 1/16 296/180.5 |
| 2009/0286461 | A1 * | 11/2009 | Molnar | B62D 35/007 454/152 |
| 2012/0223545 | A1 * | 9/2012 | Goenueldinc | B62D 35/007 296/180.5 |
| 2014/0021742 | A1 * | 1/2014 | Durm | B62D 35/007 296/180.5 |
| 2015/0091325 | A1 * | 4/2015 | Shiga | B62D 37/02 296/180.1 |
| 2016/0318560 | A1 | 11/2016 | Kishima | |

FOREIGN PATENT DOCUMENTS

| | | |
|---|---|---|
| KR | 10-1997-0041919 | 7/1997 |
| KR | 10-1997-0041922 B1 | 9/1998 |
| KR | 10-2006-0072429 A | 6/2006 |
| KR | 10-2011-0113891 A | 10/2011 |

* cited by examiner

[FIG. 1]
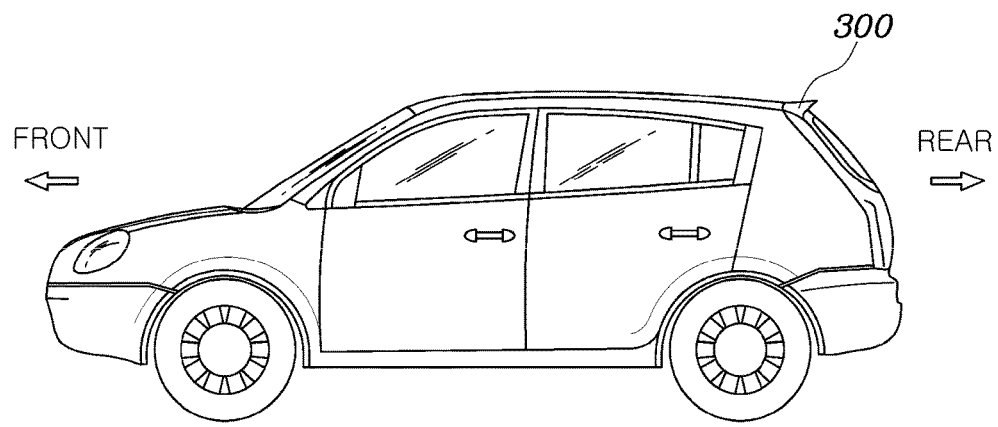
[FIG. 2]
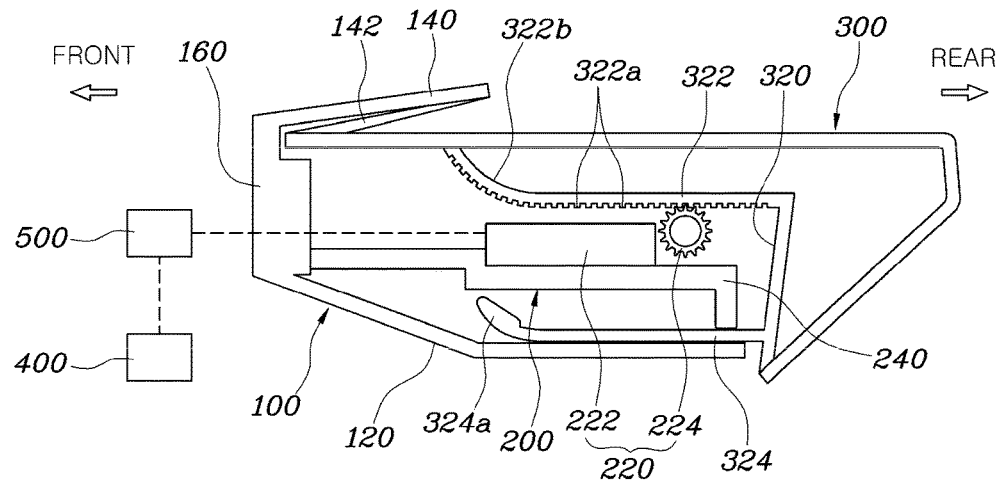

[FIG. 3]
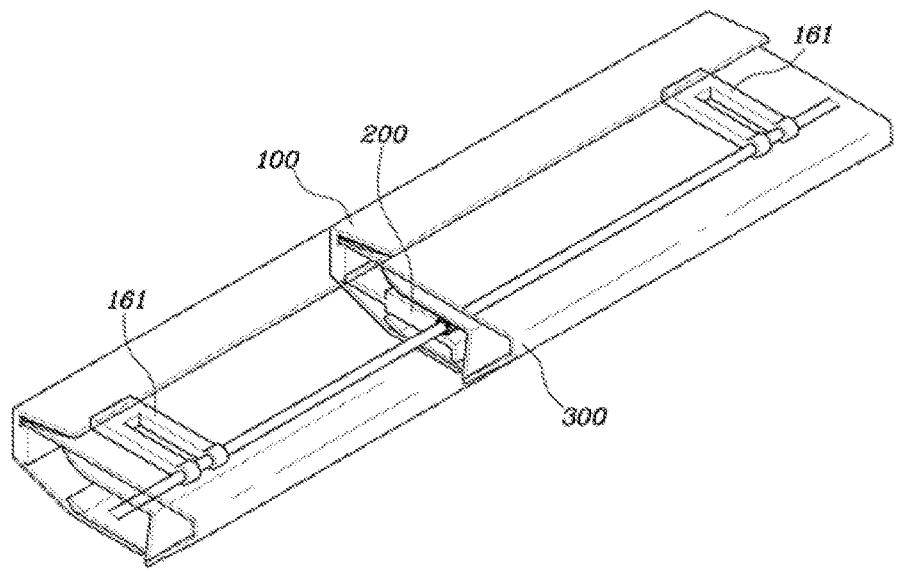
[FIG. 4]
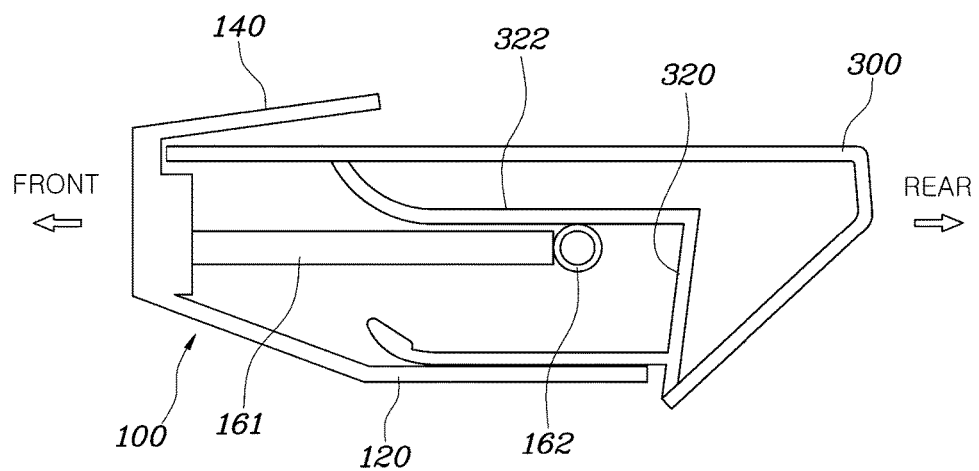

[FIG. 5]
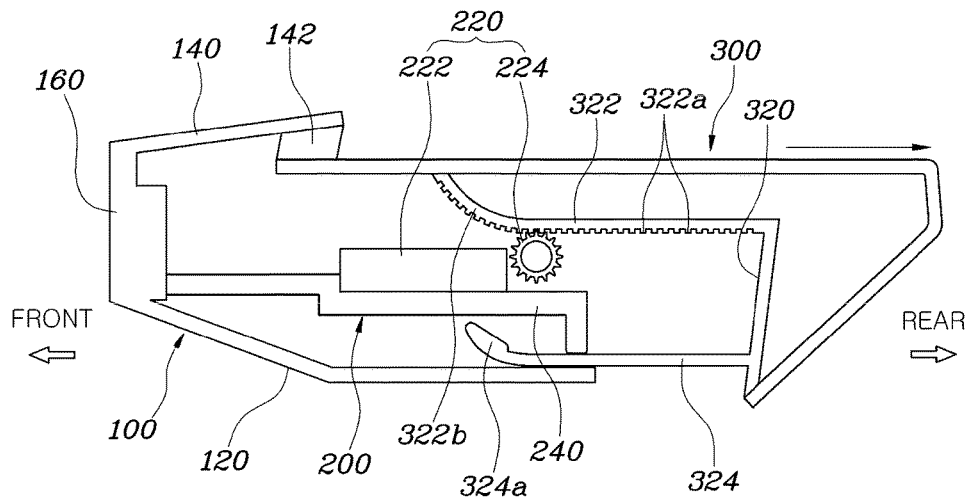
[FIG. 6]
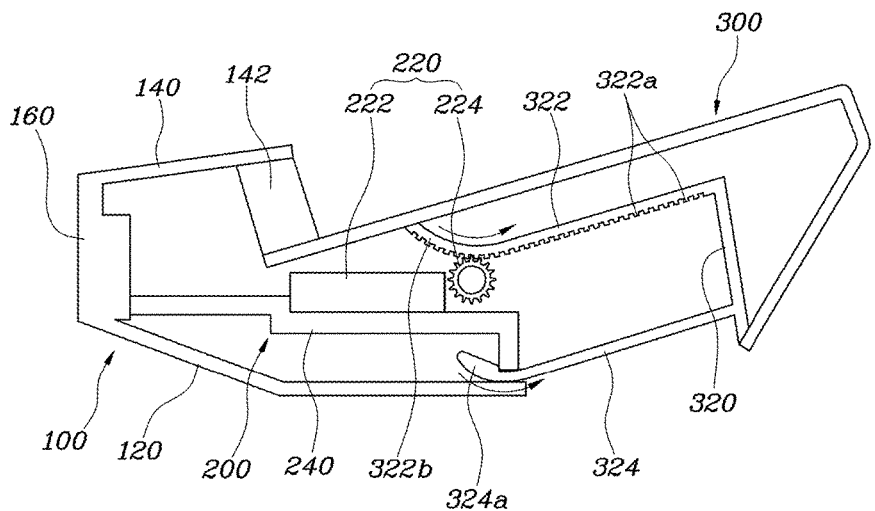

[FIG. 7]
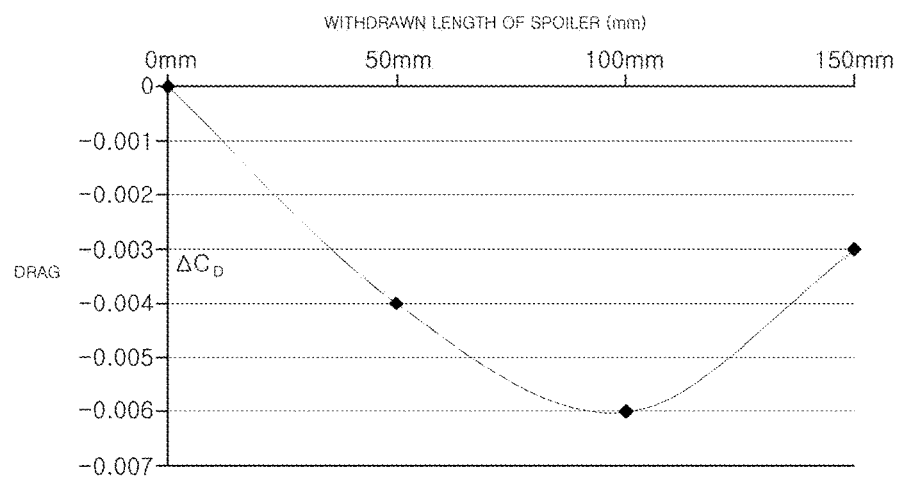
[FIG. 8]
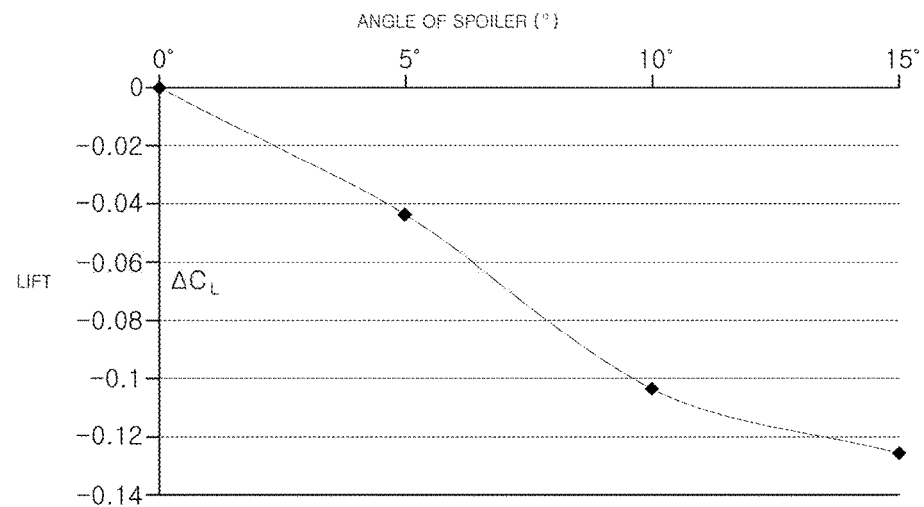

SPOILER APPARATUS FOR RV VEHICLE

CROSS REFERENCE TO RELATED APPLICATION

The present application claims benefit of and priority to Korean Patent Application No. 10-2016-0151100 filed on Nov. 14, 2016, the entire contents of which is incorporated herein for all purposes by this reference.

BACKGROUND

Technical Field

The present disclosure relates to a spoiler apparatus for an RV (recreational vehicle) vehicle, and, more particularly, to a spoiler apparatus for the RV vehicle or a SUV (sport utility vehicle), capable of improving fuel efficiency and ensuring driving stability by controlling aerodynamics of a vehicle according to the traveling speed thereof.

Description of the Related Art

When a vehicle travels at a high speed, air in the atmosphere is compressed and turbulence is thus generated, thereby causing the driving stability and performance of the vehicle to deteriorate. To solve such problems, a rear spoiler may be installed on the vehicle. The rear spoiler controls the air flow behind the vehicle and increases the pressure exerted on the vehicle which forces the vehicle toward the road, so as to improve the driving stability and performance of the vehicle when traveling at a high speed.

However, when the position of the rear spoiler is fixed and maintained, the rear spoiler may not cope with changes in the driving conditions of the vehicle due to the limited control of the air flow. In particular, a rear spoiler may not be installed on an RV vehicle due to the design and structural problems thereof. For this reason, because a fixed spoiler is typically applied to the rear of the body of the RV vehicle, air flow is restrictively controlled.

The foregoing is intended merely to aid in the understanding of the background of the present disclosure, and is not intended to mean that the present disclosure falls within the purview of the related art that is already known to those skilled in the art.

SUMMARY OF THE DISCLOSURE

The present disclosure has been made keeping in mind the above problems occurring in the related art, and describes a spoiler apparatus for an RV vehicle, capable of improving driving performance and stability by controlling air flow based on the traveling speed of the RV vehicle.

In accordance with a first aspect of the present disclosure, a spoiler apparatus for an RV vehicle includes a base housing having an opening at the rear thereof and installed at a rear of a vehicle; a guide fitting installed in the base housing and coupled to a drive unit, the guide fitting forming a sliding section together with the base housing; and a spoiler in contact with the guide fitting so as to slide rearward of the base housing when the drive unit is operated; the spoiler being configured to surround and be in slidable contact with the guide fitting when the spoiler is extended rearward, and wherein the spoiler and guide fitting are configured such that the spoiler tilts after a certain amount of extension rearward.

The base housing may be installed in a rear upper portion of the vehicle, and have a lower edge extending rectilinearly and an upper edge extending obliquely upward.

The upper edge of the base housing and the spoiler may be connected by a debris guard having a variable length, thereby preventing debris from being introduced between the base housing and the spoiler.

The spoiler may have an installation space defined therein that surrounds the guide fitting, and the drive unit may in contact with to an upper surface of the installation space, and the guide fitting may be in contact with a lower surface of the installation space.

The guide fitting may include a support that extends rearward from a front side of the base housing and then bends and extends downward. A tip of the support may be spaced apart from a lower edge of the base housing by a predetermined distance. The lower surface of the installation space of the spoiler may be slidably connected to a space between the guide fitting support and the lower edge of the base housing.

The lower surface of the installation space may have a bent end, a front tip of which is bent and extends upward, so that the spoiler is tilted by the bent end supported by the guide fitting when the spoiler is extended rearward and the bent end comes into contact with the guide fitting.

The drive unit may include a motor installed on the guide fitting and a pinion gear rotated by power transferred from the motor, and the spoiler may include a rack gear formed on the upper surface of the installation space and in contact with the pinion gear. The spoiler may extend (i.e. slide in a rearward direction) or retract (i.e. slide in a forward direction) when the motor is operated such that the pinion gear engages and move along the rack gear.

The upper surface of the installation space may have an bent section, a front tip of which is bent and extends upward, so that the spoiler is tilted as the pinion gear moves along a bent surface of the bent section when the spoiler is extended rearward.

The base housing may include at least one stationary structure installed therein and spaced apart from the guide fitting. The installation space of the spoiler surrounds the guide fitting and the stationary structure, and an upper surface of the installation space may be supported by the stationary structure.

The stationary structure may have a rotary roller installed at a tip thereof, and the rotary roller may come into rolling contact with the upper surface of the installation space.

The spoiler apparatus may further include a speed sensor configured to measure a traveling speed of the vehicle, and a controller configured to control the operation of the drive unit according to the traveling speed of the vehicle, based on speed information received from the speed sensor.

The controller may store preset drive modes correlated to the vehicle speed and control the drive unit such that the spoiler is extended rearward in a fuel economy drive mode in a preset low-speed range, and control the drive unit such that the spoiler is extended rearward and tilted in a high-speed drive mode in a preset high-speed range.

As apparent from the above description, the spoiler apparatus for an RV vehicle can improve driving performance and stability by installing the spoiler to the RV vehicle so as to control an air flow according to the traveling speed thereof.

BRIEF DESCRIPTION OF THE DRAWINGS

The above and other objects, features and advantages of the present disclosure will be more clearly understood from the following detailed description taken in conjunction with the accompanying drawings, in which:

FIG. 1 is a view illustrating a spoiler apparatus for an RV vehicle according to an example embodiment of the present disclosure;

FIG. 2 is a cross-sectional view of the example spoiler apparatus for an RV vehicle illustrated in FIG. 1;

FIG. 3 is a perspective view of the example spoiler apparatus for an RV vehicle illustrated in FIG. 1;

FIG. 4 is a cross-sectional view illustrating operation of the example spoiler apparatus for an RV vehicle illustrated in FIG. 1;

FIG. 5 is a cross-sectional view illustrating operation of the example spoiler apparatus for an RV vehicle illustrated in FIG. 1;

FIG. 6 is a cross-sectional view illustrating operation of the example spoiler apparatus for an RV vehicle illustrated in FIG. 1; and FIGS. 7 and 8 are graphs illustrating the effects of the example spoiler apparatus for an RV vehicle illustrated in FIG. 1 on drag and lift respectively.

DESCRIPTION OF PREFERRED EMBODIMENTS

A spoiler apparatus for an RV vehicle according to the preferred embodiments of the present disclosure is described below with reference to the accompanying drawings.

As illustrated in FIGS. 1 and 2, the spoiler apparatus for an RV vehicle according to an example embodiment of the present disclosure includes a base housing 100 having an open rear section installed at the rear of a vehicle; a guide fitting 200 installed in base housing 100; a drive unit 220 coupled to guide fitting 200 for transfer of power and forming a sliding section together with base housing 100, and a spoiler 300 connected to guide fitting 200 so as to slide rearward of base housing 100 when drive unit 220 is operated, wherein spoiler 300 and guide fitting 200 are configured such that spoiler 300 extends rearward and/or tilts depending on the amount of rearward extension.

The example embodiment of the spoiler apparatus for an RV vehicle includes base housing 100, guide fitting 200 coupled to drive unit 220, and spoiler 300 configured to slide and tilt in base housing 100 when drive unit 220 is operated. Here, base housing 100 is installed in the rear upper portion of the vehicle, and has a space defined therein to accommodate spoiler 300. Guide fitting 200 and drive unit 220 are installed in base housing 100. Spoiler 300 connected to the drive unit 220 moves in forward and rearward directions (with respect to the longitudinal axis of the vehicle), i.e it may extend from or retract into base housing 100 as a result of the power transferred from drive unit 220. In particular, spoiler 300 extends (i.e. slides in the rearward direction) or retracts (i.e. slides in the forward direction) as drive unit 220 is operated, and depending on the amount of extension, spoiler 300 tilts due to contact with guide fitting 200.

Because air flow is controlled according to the traveling conditions of the vehicle by adjusting the angle of spoiler 300, the spoiler apparatus of the present disclosure can improve fuel efficiency and driving stability.

In more detail, base housing 100 is installed in the rear upper portion of the vehicle, and has a lower edge 120 extending rectilinearly and an upper edge 140 extending obliquely upward, as illustrated in FIG. 2.

Because the base housing 100 is installed in the rear upper portion of the vehicle, spoiler 300 may control air flow. Lower edge 120 of base housing 100 extends rectilinearly such that spoiler 300 slides in the forward and rearward directions, and upper edge 140 extends obliquely upward so as to always control a portion of air flow.

Because spoiler 300 is configured to slide and tilt in base housing 100, a gap may be formed between spoiler 200 and upper edge 140 of base housing 100 when spoiler 300 tilts. Accordingly, as illustrated in FIGS. 2 and 6, the spoiler apparatus according to an example embodiment of the present disclosure includes debris guard 142 which is connected to upper edge 140 of base housing 100 and spoiler 300 so as to prevent debris from being introduced between base housing 100 and spoiler 300. Therefore, it is possible to prevent drive unit 220 from being contaminated by debris that would interfere with operation of drive unit 220.

As illustrated in FIG. 2, spoiler 300 has an installation space 320 defined therein that surrounds guide fitting 200. Drive unit 220 may be connected to an upper surface 322 of installation space 320 and guide fitting 200 may be connected to a lower surface 324 of installation space 320.

The lower surface 324 of installation space 320 is in contact with guide fitting 200 installed in base housing 100 so that spoiler 300 is guided to slide in the extension (i.e. rearward) or retraction (i.e. forward) direction. Upper surface 322 of installation space 320 is in contact with drive unit 220 provided in guide fitting 200 so that spoiler 300 moves by the power transferred during operation of drive unit 220. Spoiler 300 may have various external shapes according to the design of the vehicle.

In detail, in an example embodiment, guide fitting 200 includes a support 240 extending rearward from a front side 160 of base housing 100 and then bending and extending downward. The tip of support 240 is spaced apart from the lower edge 120 by a predetermined distance. The lower surface 324 of installation space 320 of spoiler 300 may be slidably inserted into the space between support 240 of guide fitting 200 and the lower edge 120 of the base housing 100.

As illustrated in FIG. 2, guide fitting 200 is fixedly installed to the front side 160 of base housing 100 and extends rearward from front side 160 of base housing 100. Support 240 is bent from the extended portion of guide fitting 200 and extends downward so as to support the lower end of spoiler 300. Drive unit 220 is installed in a section of guide fitting 200 between front side 160 of base housing 100 and the bent portion of support 240. The tip of support 240 of guide fitting 200, which extends downward, is spaced apart from the lower edge 120 of base housing 100 by a predetermined distance, thereby defining a space for insertion of and contact with lower surface 324 of installation space 320 of spoiler 300. Because side 324 of installation space 320 of spoiler 300 is inserted into the space between support 240 of guide fitting 200 and lower edge 120 of base housing 100, spoiler 300 may be supported so as to stably slide in the forward and rearward directions.

Spoiler 300 performs an extension or retraction operation and a tilting operation in an example embodiment according to the present disclosure. As illustrated in FIG. 2, lower surface 324 of the installation space 320 has a bent end 324a, the front tip of which is bent and extends upward, so that spoiler 300 may be tilted by bent end 324a supported by guide fitting 200 when spoiler 300 is extended rearward and bent end 324a comes into contact with guide fitting 200.

That is, the lower surface 324 of installation space 320 extends rectilinearly, and thus spoiler 300 I supported by guide fitting 200 and slides rectilinearly in the forward and rearward directions. When bent end 324a comes into contact with guide fitting 200, spoiler 300 may be tilted along the bent surface of the bent end 324a. Referring to FIG. 6, when spoiler 300 slides rearward due to operation of drive unit 220 to the point where bent end 324a comes into contact with support 240 of guide fitting 200, spoiler 300 is tilted along the bent surface of bent end 324a.

Because spoiler 300 is extended rearward from base housing 100 and is tilted in the extended state, spoiler 300 may properly control air flow according to the traveling conditions of the vehicle.

As illustrated in FIG. 2, in an example embodiment, drive unit 220 includes a motor 222 installed to guide fitting 200, and a pinion gear 224 which is rotatable by the power transferred from motor 222. In this embodiment, spoiler 300 includes a rack gear 322a formed on upper surface 322 of installation space 320 and engaged with pinion gear 224. When motor 222 is operated, pinion gear 224 engages rack gear 322a, causing spoiler 300 to extend or retract.

Spoiler 300 extends or retracts and tilts as it extends or retracts. As illustrated in FIG. 2, upper surface 322 of installation space 320 has a bent section 322b, the front tip of which is bent and extends upward, so that spoiler 300 may be tilted when pinion gear 224 moves along the bent surface of the bent section 322b when spoiler 300 is extended rearward. That is, when pinion gear 224 reaches bent section 322b, the front tip of which is bent and extends upward, spoiler 300 is tilted as pinion gear 224 travels along the bent surface of the bent section 322b. Referring to FIG. 6, when pinion gear 224 reaches the bent section 322b formed on upper surface 322 of installation space 320 of spoiler 300, rack gear 322a extending to bent section 322b is moved by the power transferred through pinion gear 224 so that spoiler 300 is tilted along the bent surface of bent section 322b. Because spoiler 300 is extended rearward from base housing 100 and is tilted, spoiler 300 may properly control an air flow according to the traveling conditions of the vehicle.

As illustrated in FIGS. 3 and 4, base housing 100 includes at least one stationary structure 161 installed therein and spaced apart from guide fitting 200. Installation space 320 surrounds guide fitting 200 and the stationary structures 161, and the upper surface 322 of installation space 320 may be supported by stationary structures 161.

That is, because the spoiler 300 extends in laterally across the body of the vehicle, there is a need for an additional positioning and guide structure in order to smoothly support and slide spoiler 300. Thus, in an example embodiment, base housing 100 includes a plurality of stationary structures 161 which are installed on opposite sides of guide fitting 200 and stably support spoiler 300.

Accordingly, because upper surface 322 of installation space 320 of spoiler 300 comes into contact with and is supported by the stationary structures 161 formed at the opposite sides of guide fitting 200, when spoiler 300 is moved by the power transferred from drive unit 220, it may be securely held in place even when traveling wind is applied to spoiler 300.

In this embodiment, each of the stationary structures 161 has a rotary roller 162 installed at the tip thereof, and the rotary roller 162 may come into rolling contact with upper surface 322 of installation space 320.

In an example embodiment, the spoiler apparatus further includes a speed sensor 400 which measures the traveling speed of the vehicle, and a controller 500 which controls drive unit 220 and determines an operation amount for drive unit 220 according to the traveling speed of the vehicle, based on speed information received from speed sensor 400.

Controller 500 may store preset drive modes related to the vehicle speed that correlate to specific settings for extension, retraction, and/or tilt of spoiler 300. For example, controller 500 may control drive unit 220 such that spoiler 300 is extended rearward when the vehicle is in a fuel economy drive mode in a preset low-speed range, and may control drive unit 220 such that the spoiler 300 is extended rearward and tilted when the vehicle is in a high-speed drive mode in a preset high-speed range. Here, the low-speed and high-speed ranges, which are preset in controller 500, may be set differently from each other depending on the design of the vehicle. In the low-speed range, the fuel economy drive mode, in which the spoiler 300 is extended rearward, is engaged due to low traveling resistance. In the high-speed range, the high-speed drive mode, in which the spoiler 300 is extended rearward and tilted, is engaged in order to improve driving stability, allowing the vehicle to stably travel on the road.

For example, spoiler 300 is not extended in a traveling speed range of 0 kph to 80 kph, but the fuel economy drive mode is engaged and spoiler 300 is extended when the traveling speed is 80 kph or more. However, when the traveling speed is 55 kph or less when the mode re-enters an initial state from the state in which the fuel economy drive mode is engaged, spoiler 300 retracts to the original position, so that the spoiler 300 is not unnecessarily and repeatedly operated. Here, when the fuel economy drive mode is engaged, spoiler 300 may be extended by a preset distance (for example, 100 mm) stored in controller 500. As illustrated in FIG. 7, when the fuel economy drive mode is engaged, aerodynamic performance is improved by decreasing drag resulting in an increase in rear pressure of the vehicle.

Meanwhile, when the traveling speed is 160 kph or more, the high-speed drive mode is engaged for driving stability. When the traveling speed is 140 kph or less, spoiler 300 may be operated sequentially in reverse order. Here, when the high-speed drive mode is engaged, spoiler 300 may be tilted by a preset angle (for example, 15°) stored in controller 500. As illustrated in FIG. 8, when the high-speed drive mode is engaged, safe driving performance is secured from generation of lift forcing the vehicle toward the road and thus an increase in pressure.

In accordance with example embodiments of the spoiler apparatus for an RV vehicle having the above-mentioned structure, it is possible to improve driving performance and stability by installing spoiler 300 to the RV vehicle so as to control air flow according to the traveling speed thereof.

Although the preferred embodiments of the present disclosure have been presented for illustrative purposes, those skilled in the art will appreciate that various modifications, additions and substitutions are possible, without departing from the scope and spirit of the invention as disclosed in the accompanying claims.

What is claimed is:

1. A spoiler apparatus for an RV vehicle, comprising:
a base housing having an opening at the rear thereof and installed at a rear of a vehicle;
a guide fitting installed in the base housing and coupled to a drive unit for transfer of power; and
a spoiler in slidable contact with the guide fitting;
wherein operation of the drive unit causes the spoiler to slidably extend rearward from the base housing along the guide fitting, and wherein continued operation of the drive unit causes the spoiler to tilt.

2. The spoiler apparatus according to claim 1, wherein the base housing is installed in a rear upper portion of the vehicle, and has a lower edge extending rectilinearly and an upper edge extending obliquely upward.

3. The spoiler apparatus according to claim 2, wherein the upper edge of the base housing and the spoiler are connected by a debris guard having a variable length.

4. The spoiler apparatus according to claim 1, wherein the spoiler comprises an installation space therein that surrounds the guide fitting, and wherein the drive unit is in contact with an upper surface of the installation space, and the guide fitting is in contact with a lower surface of the installation space.

5. The spoiler apparatus according to claim 4, wherein:
the guide fitting further comprises a support that extends rearward from a front side of the base housing and bends and extends downward, and a tip of the support is spaced apart from the lower edge of the base housing by a predetermined distance; and
the lower surface of the installation space of the spoiler is slidably inserted into a space between the support of the guide fitting and the lower edge of the base housing.

6. The spoiler apparatus according to claim 5, wherein the lower surface of the installation space has a bent end, a front tip of which is bent and extends upward, so that the spoiler is tilted by the bent end supported by the guide fitting when the spoiler is extended rearward and the bent end comes into contact with the guide fitting.

7. The spoiler apparatus according to claim 4, wherein:
the drive unit comprises a motor installed on the guide fitting, and a pinion gear rotated by power transferred from the motor; and
the spoiler further comprises a rack gear formed on the upper surface of the installation space and engaged with the pinion gear, such that the spoiler reversibly slides when the motor is operated and rotates the pinion gear.

8. The spoiler apparatus according to claim 7, wherein the upper surface of the installation space has an bent section, a front tip of which is bent and extends upward, so that the spoiler is tilted as the pinion gear moves along the bent section when the spoiler is extended rearward.

9. The spoiler apparatus according to claim 1, wherein:
the base housing further comprises at least one stationary structure installed therein and spaced apart from the guide fitting; and
the spoiler further comprises an installation space surrounding the guide fitting and the stationary structure, and an upper surface of the installation space is supported by the stationary structure.

10. The spoiler apparatus according to claim 9, wherein the stationary structure further comprises a rotary roller installed at a tip thereof, and the rotary roller comes into rolling contact with the upper surface of the installation space.

11. The spoiler apparatus according to claim 1, further comprising:
a speed sensor that measures a traveling speed of the vehicle; and
a controller configured to control the operation of the drive unit based on speed information received from the speed sensor.

12. The spoiler apparatus according to claim 11, wherein the controller stores preset drive modes correlated to vehicle speeds, and wherein the controller controls the drive unit such that the spoiler is extended rearward in a preset low-speed range, and controls the drive unit such that the spoiler is tilted in a preset high-speed range.

* * * * *